2,814,632
Patented Nov. 26, 1957

United States Patent Office

2,814,632

STEROID COMPOUNDS AND METHODS FOR THEIR MANUFACTURE

Alexander L. Nussbaum, Bloomfield, N. J., assignor to Schering Corporation, Bloomfield, N. J., a corporation of New Jersey No Drawing. Application February 21, 1957, Serial No. 641,487

21 Claims. (Cl. 260—397.45)

This invention relates to a new group of steroid compounds and to methods for their manufacture. More particularly, my invention relates to the 21-thiol analogues of prednisone and prednisolone, together with their 9α-fluoro derivatives and their lower alkanoic esters such as the acetate and the propionate.

The compounds of my invention may be represented by the following general formula:

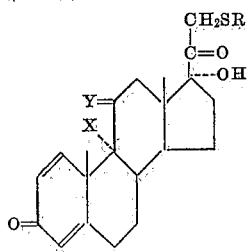

wherein X is a member of the group consisting of hydrogen and fluorine; Y is a member of the group consisting of

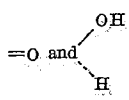

and R is a member of the group consisting of H and acyl radicals of lower alkanoic acids.

I have found that the compounds of the general formula are adrenocorticoid in their action and are thus useful in the treatment of inflammation, arthritic diseases and certain other collagen diseases such as disseminated lupus, polyarteritis and the like. The thio-compounds of my invention as compared with their oxygen analogues, exhibit a greater diuretic action. Thus, following administration of these thio-compounds, there is relatively little sodium retention and concomitant edema, which is so common with many of the adrenocortical hormones and corticoids heretofore in use. My new compounds are thus preferentially employed especially when adrenocorticoid deficiencies are accompanied by cardiac insufficiencies. The new compounds of this invention by exerting a marked diuresis are useful adjuncts in the treatment of congestive heart failure.

In addition, the free thiol-compounds of my invention form insoluble precipitates with heavy metals such as lead and may be used in the qualitative or quantitative estimation of such heavy metals.

The compounds of my invention may readily be prepared from the known compounds, prednisone and prednisolone. The 21-hydroxy group of these compounds is esterified with the acid chloride of an alkyl- or aryl-sulfonic acid such as methyl-, ethyl-, benzene-, or p-toluenesulfonic acid. The reaction may be carried out in the presence of a base such as pyridine or triethylamine, and with or without a solvent such as chloroform, dimethylformamide, dioxane or the like. The resulting ester is converted to the 21-iodide or 21-bromide by means of sodium iodide or sodium bromide in the known manner. The 21-halide so obtained is of sufficient purity to be used in subsequent transformations without further purification. The 21-iodide of prednisone or prednisolone and a salt, preferably alkali metal, of a thiol acid such as thiolacetic or thiolpropionic are heated together in a preferably refluxing solvent such as acetone or methanol to yield the new compounds 1,4-pregnadiene-17α-ol-21-thiol-3,11,20-trione 21-acetate (or propionate) when the starting material is prednisone; and 1,4-pregnadiene - 11β,17α - diol - 21 - thiol - 3,20 - dione 21 - acetate (or propionate) from prednisolone. 1,4-pregnadiene-17α-ol-21-thiol-3,11,20-trione 21-acetate (or propionate) may also be prepared from the corresponding 11-hydroxy compound by oxidation with agents such as chromium trioxide (with or without pyridine present), sodium dichromate, N-bromoacetamide, N-bromosuccinimide, and the like.

The free 21-SH compounds of my invention may be prepared from the thiolesters described above by subjecting said esters to the action of *Flavobacterium dehydrogenans* var. *hydrolyticum* as analogously described in the co-pending application of William Charney, Serial No. 458,661, filed September 27, 1954. Thus, 1,4-pregnadiene-17α-ol-21-thiol-3,11,20-trione and 1,4-pregnadiene-11β,17α-diol-21-thiol - 3,20 - dione are obtained from their corresponding 21-thiolesters.

To prepare the compounds of my invention in which there is a 9α-fluoro moiety, similar methods to the above are applicable starting with either 9α-fluoroprednisone or 9α-fluoroprednisolone.

The following examples set forth methods for preparing the compounds embraced by my invention; however, it is to be understood that the examples are presented for illustrative purposes and my invention is limited only as set forth in the appended claims.

EXAMPLE 1

*1,4-pregnadiene-11β,17α-diol-21-thiol-3,20-dione 21-acetate*

A. 1,4-PREGNADIENE-11β,17α,21-TRIOL-3,20-DIONE 21-P-TOLUENESULFONATE

To a solution of 10 grams of prednisolone in 57.5 ml. of pyridine, frozen in a Dry Ice-acetone bath, is added a chilled solution of 5.9 grams of p-toluenesulfonyl chloride in 47 ml. of methylene chloride. The mixture is maintained in a Dry Ice-acetone bath for 2 hours and then allowed to stand at −18° C. for 20 hours. Cold ether (500 ml.) is added and the resulting solution is extracted in turn with water, dilute hydrochloric acid, dilute sodium bicarbonate, and finally water. The non-aqueous solution is dried over sodium sulfate, filtered, and concentrated to dryness in vacuo. The residue is crystallized from methanol, yielding 13.4 grams of 1,4-pregnadiene-11β,17α,21-triol-3,20-dione 21-p-toluenesulfonate, M. P. 128–135° C.; ultraviolet absorption at 228 mμ (ε=21,300), shoulder at 242 mμ (ε=15,000).

B. 21-IODO-1,4-PREGNADIENE-11β,17α-DIOL-3,20-DIONE 10 grams of the 21-p-toluenesulfonate of prednisolone prepared above is dissolved in 50 ml. of acetone, and 10 grams of sodium iodide in 70 ml. of acetone is added. The mixture is refluxed for seven minutes during which time a heavy precipitate forms. The mixture is concentrated to dryness in vacuo and 300 ml. of 0.33 N sodium thiosulfate is added to the residue. 21-iodo-1,4-pregnadiene-11β,17α-diol-3,20-dione which precipitates is filtered and dried to yield 8.2 grams, M. P. 160–170° C. dec.

C. 1,4-PREGNADIENE-11β,17α-DIOL-21-THIOL-3,20-DIONE 21-ACETATE

A solution of 5 grams of 21-iodo-prednisolone (from 1B) in 250 ml. of acetone is added to a suspension of 1.7 grams of potassium thiolacetate in 200 ml. of acetone. The mixture is refluxed for 2 hours, and concentrated in vacuo almost to dryness. One liter of water is added, and the resulting suspension is filtered and recrystallized from methanol to yield 3.5 grams of 1,4-pregnadiene-11β,17α-diol-21-thiol-3,20-dione 21-acetate, M. P. 237–246° C. $[\alpha]_D^{25} = +126.7$ (CHCl$_3$).

EXAMPLE 2

*1,4 - pregnadiene - 17α - ol - 21 - thiol - 3,11,20 - trione 21-acetate*

500 milligrams of 1,4-pregnadiene - 11β,17α - diol-21-thiol-3,20-dione 21-acetate is dissolved in 50 ml. of pyridine and added to a mixture consisting of 310 mg. of chromium trioxide in 35 ml. of pyridine. The reaction mixture, after standing overnight at room temperature, is poured into dilute hydrochloric acid and extracted with methylene chloride. The organic layer is extracted with dilute sodium bicarbonate and then a sufficient number of times with water until the aqueous extracts are neutral to litmus. The non-aqueous solution is dried over sodium sulfate, filtered, and concentrated to dryness in vacuo. The residue is crystallized from ether to yield 376 mg. of 1,4-pregnadiene-17α-ol-21-thiol-3,11,20-trione 21-acetate.

Alternatively, the compound of this example may be prepared as follows:

A. 1,4-PREGNADIENE-17α,21-DIOL-3,11,20-TRIONE 21-P-TOLUENESULFONATE

A solution of 10 grams of prednisone in 57 ml. of pyridine is reacted with p-toluenesulfonate in the manner described in Example 1A, yielding 1,4-pregnadiene-17α,21-diol-3,11,20-trione 21-p-toluenesulfonate, which is crystallized from methanol.

B. 21-IODO-1,4-PREGNADIENE-17α-OL-3,11,20-TRIONE 10 grams of the 21-p-toluenesulfonate of prednisone prepared above is reacted with sodium iodide in acetone as described in Example 1B, yielding 21-iodo-1,4-pregnadiene-17α-ol-3,11,20-trione.

C. 1,4-PREGNADIENE-17α-OL-21-THIOL-3,11,20-TRIONE 21-ACETATE

A solution of 5 grams of 21-iodo-prednisone prepared in Procedure B of this example, is reacted with potassium thiolacetate in the manner described in Example 1C. The resulting product, 1,4-pregnadiene-17α-ol-21-thiol-3,11,20-trione 21-acetate is recrystallized from ether.

EXAMPLE 3

*1,4-pregnadiene-11β,17α-diol-21-thiol-3,20-dione*

An inoculum is prepared as follows:

A culture of *Flavobacterium dehydrogenans* var. *hydrolyticum* (which organism is on deposit at Rutgers University under the designation *Flavobacterium dehydrogenans* 130) is grown for 24 hours with forced aeration at 28–30° C. in a medium consisting of a tap water solution containing 1% of condensed fish solubles (50% solids), 0.1% of Basamin yeast hydrolysate, 0.8% of disodium phosphate heptahydrate, 0.4% of potassium dihydrogen phosphate and 0.05% of a defoamer which has been sterilized at 125° C. under pressure for 2¼ hours.

Similarly 500 ml. of the above medium is prepared, sterilized and distributed equally among five, 300 ml. Erlenmeyer flasks. To each flask is added 2 ml. of the inoculum described above and the flasks and contents are shaken on a shake table for 16 hours at 28–30° C. To each flask is then added 200 mg. of 1,4-pregnadiene-11β,17α-diol-21-thiol-3,20-dione 21-acetate in 2 ml. of acetone, and the fermentation is continued. After 24 hours, a further addition of 200 mg. of steroid is added to each flask, and shaking is continued another 24 hours. The combined brei are then extracted twice with chloroform. The chloroform solution is treated with activated charcoal, filtered, and evaporated. The residue is crystallized from acetone-hexane to give 1,4 - pregnadiene-11β,17α-diol-21-thiol-3,20-dione.

EXAMPLE 4

*1,4-pregnadiene-17α-ol-21-thiol-3,11,20-trione*

A solution of 1,4-pregnadiene-17α-ol-21-thiol-3,11,20-trione 21-acetate in 2 ml. of acetone is subjected to the action of a culture of *Flavobacterium dehydrogenans* var. *hydrolyticum* in the manner described in Example 3 to yield 1,4-pregnadiene-17α-ol-21-thiol - 3,11,20 - trione, which is crystallized from acetone-hexane.

EXAMPLE 5

*9α - fluoro - 1,4 - pregnadiene - 11β,17α - diol - 21 - thiol - 3,20-dione 21-acetate*

A. 21-IODO-9α-FLUORO-1,4-PREGNADIENE-11β,17α-DIOL-3,20-DIONE 1.6 grams of 9α-fluoroprednisolone 21-methanesulfonate (M. P. 221–224° C. dec.) is dissolved in 68 ml. of acetone and to this is added a solution of 5.52 g. of sodium iodide in acetone. The resulting solution is refluxed for 15 minutes, during which time a heavy precipitate forms. This suspension is filtered while hot and the filtrate containing 21-iodo - 9α - fluoro-1,4-pregnadiene-11β,17α-diol-3,20-dione is used directly in the next step.

B. 9α-FLUORO-1,4-PREGNADIENE-11β,17α-DIOL-21-THIOL-3,20-DIONE 21-ACETATE

The hot acetone solution of 21-iodo - 9α - fluoro-1,4-pregnadiene-11β,17α-diol-3,20-dione is poured immediately into a suspension of 6.29 g. of potassium thiolacetate in 75 ml. of acetone. The mixture is refluxed for 2 hours, and then concentrated in vacuo. Water (350 ml.) is added to the residue and the precipitate is filtered and dried yielding 1.43 g. of 9α-fluoro-1,4-pregnadiene-11β,17α-diol-21-thiol-3,20-dione 21-acetate, M. P. 225–233° C.

EXAMPLE 6

*9α-fluoro - 1,4 - pregnadiene - 17α - ol - 21 - thiol - 3,11,20-trione 21-acetate*

500 milligrams of the product of Example 5 is dissolved in 50 ml. of pyridine and oxidized with chromium trioxide in the manner described in Example 2, to yield 9α-fluoro-1,4-pregnadiene-17α-ol-21-thiol-3,11,20-trione 21-acetate.

EXAMPLE 7

*9α-fluoro - 1,4 - pregnadiene - 17α - ol - 21 - thiol - 3,11,20-trione 21-propionate*

A. 9α-FLUORO-1,4-PREGNADIENE-17α,21-DIOL-3,11,20-TRIONE 21-METHANESULFONATE 2.5 grams of 9α-fluoro - 1,4 - pregnadiene-17α,21-diol-3,11,20-trione is dissolved in 75 ml. of methylene chloride and cooled to 0° C. To the cooled solution is added 5 ml. of pyridine and 10 ml. of methanesulfonyl chloride. The reaction mixture is held at 0° C. for 2 hours, and then at room temperature for 20 hours. Ethyl acetate (250 ml.) is added and the organic solution is washed in turn with dilute hydrochloric acid, dilute aqueous sodium carbonate, and finally water. The ethyl acetate solution is dried over sodium sulfate, filtered, and concentrated in vacuo to incipient crystallization. Upon cooling and filtration there is obtained 1.7 g. of 9α-fluoro-1,4-pregnadiene-17α,21-diol-3,11,20-dione 21-methanesulfonate.

B. 21-IODO-9α-FLUORO-1,4-PREGNADIENE-17α,21-DIOL-3,11,20-TRIONE 1.5 grams of 9α-fluoroprednisone 21-methanesulfonate in 65 ml. of acetone is reacted with 5.45 grams of sodium iodide in the manner described in Example 5A. The hot filtrate containing 21-iodo - 9α - fluoroprednisone is used directly in the next step.

C. 9α-FLUORO-1,4-PREGNADIENE-17α-OL-21-THIOL-3,11,20-TRIONE 21-PROPIONATE

The hot solution of 21-iodo-9α-fluoro-1,4-pregnadiene-17α,21-diol-3,11,20-trione in acetone is added directly to a suspension of 6.7 g. of potassium thiolpropionate in 75 ml. of acetone and refluxed for 2 hours. The mixture is concentrated in vacuo, and 350 ml. of water is added to the residue. The precipitate is filtered and dried, yielding 9α-fluoro-1,4-pregnadiene-17α-ol-21-thiol-3,11,20-trione 21-propionate.

EXAMPLE 8

*9α-fluoro-1,4-pregnadiene-11β,17α-diol-21-thiol-3,20-dione*

200 milligrams of 9α-fluoro-11β,17α-diol-21-thiol-3,20-dione 21-acetate (product of Example 5) is subjected to the action of a culture of *Flavobacterium dehydrogenans* var. *hydrolyticum* in the manner described in Example 3, to yield 9α-fluoro-1,4-pregnadiene-11β,17α-diol-21-thiol-3,20-dione which is crystallized from acetone-hexane.

EXAMPLE 9

*9α-fluoro-1,4-pregnadiene-17α-ol-21-thiol-3,11,20-trione*

200 milligrams of 9α-fluoro-17α-ol-21-thiol-3,11,20-trione 21-propionate (product of Example 7) is subjected to the action of a culture of *Flavobacterium dehydrogenans* var. *hydrolyticum* in the manner described in Example 3 to yield 9α-fluoro-1,4-pregnadiene-17α-ol-21-thiol-3,11,20-trione.

I claim:
1. Compounds having the structural formula

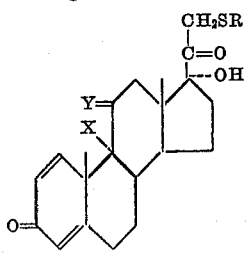

wherein X is a member of the group consisting of hydrogen and fluorine; Y is a member of the group consisting of O and (H, OH) and R is a member of the group consisting of H and acyl radicals of lower alkanoic acids.

2. A 21-lower alkanoate of 1,4-pregnadiene-11β,17α-diol-21-thiol-3,20-dione.
3. A 21-lower alkanoate of 1,4-pregnadiene-17α-ol-21-thiol-3,11,20-trione.
4. A 21-lower alkanoate of 9α-fluoro-1,4-pregnadiene-11β,17α-diol-21-thiol-3,20-dione.
5. 1,4-pregnadiene-11β,17α-diol-21-thiol-3,20-dione 21-acetate.
6. 1,4-pregnadiene-17α-ol-21-thiol-3,11,20-trione 21-acetate.
7. 9α-fluoro-1,4-pregnadiene-11β,17α-diol-21-thiol-3,20-dione 21-acetate.
8. 9α-fluoro-1,4-pregnadiene-17α-ol-21-thiol-3,11,20-trione 21-propionate.
9. 1,4-pregnadiene-11β,17α-diol-21-thiol-3,20-dione.
10. 1,4-pregnadiene-17α-ol-21-thiol-3,11,20-trione.
11. 9α-fluoro-1,4-pregnadiene-11β,17α-diol-21-thiol-3,20-dione.
12. In the process for preparing steroid compounds of the formula

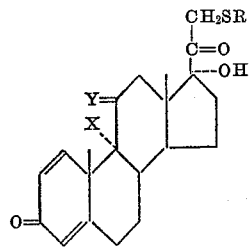

wherein X is a member of the group consisting of hydrogen and fluorine; Y is a member of the group consisting of O and (H, OH); and R is a member of the group consisting of H and acyl radicals of lower alkanoic acids, the step which comprises heating together at slightly elevated temperatures a pregnadiene of the formula

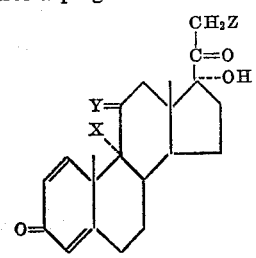

wherein X and Y are as above defined and Z is a halogen radical having an atomic weight greater than chlorine with a salt of a thiol-lower alkanoic acid.

13. The process of claim 12 wherein the reaction is carried out in an inert organic solvent.
14. The process of claim 13 wherein the salt of the thiol-lower alkanoic acid is potassium thiolacetate.
15. The process according to claim 14 wherein the starting steroid is 21-iodo-1,4-pregnadiene-17α-ol-3,11,20-trione.
16. The process according to claim 14 wherein the starting steroid is 21-iodo-9α-fluoro-1,4-pregnadiene-17α-ol-3,11,20-trione.
17. The process according to claim 14 wherein the starting steroid is 21-iodo-1,4-pregnadiene-11β,17α-diol-3,20-dione.
18. The process of claim 17 including the step of oxidizing the 11β-hydroxyl group to a ketone.
19. The process of claim 14 wherein the starting steroid is 21-iodo-9α-fluoro-1,4-pregnadiene-11β,17α-diol-3,20-dione.
20. The process of claim 19 including the step of oxidizing the 11β-hydroxyl group to a ketone.
21. The process of claims 12–14 including the step of hydrolyzing the 21-thiolester to form a 21-thiol.

No references cited.